United States Patent [19]

Monrolin et al.

[11] 4,283,789
[45] Aug. 11, 1981

[54] DATA TRANSMISSION METHOD AND DEVICES FOR PRACTICING SAID METHOD

[75] Inventors: Jean L. Monrolin; Pierre Vachee, both of LaGaude, France

[73] Assignee: International Business Machines Corp., Armonk, N.Y.

[21] Appl. No.: 70,549

[22] Filed: Aug. 29, 1979

[30] Foreign Application Priority Data

Oct. 9, 1978 [FR] France ................. 78 29352

[51] Int. Cl.³ .............. H04B 1/20; H04N 3/00; H03K 13/00
[52] U.S. Cl. ................ 375/55; 340/347 DD
[58] Field of Search .......... 375/17, 55, 94, 95; 371/56; 340/170, 147 CN, 347 DD; 307/355, 357, 360, 361, 236

[56] References Cited

U.S. PATENT DOCUMENTS

| | | | |
|---|---|---|---|
| 3,261,920 | 7/1966 | Aaron | 340/172 |
| 3,369,181 | 2/1968 | Braymer | 375/55 |
| 3,601,806 | 8/1971 | Heimbigner | 340/151 |
| 3,723,880 | 3/1973 | Van Gerwen | 375/17 |
| 3,842,401 | 10/1974 | Smith, Jr. et al. | 375/17 |
| 3,916,313 | 10/1975 | Lowry | 375/1 |
| 3,965,294 | 6/1976 | Renz et al. | 375/17 |
| 4,071,692 | 1/1978 | Weir et al. | 375/17 |
| 4,087,642 | 5/1978 | Jessop et al. | 375/17 |
| 4,097,859 | 6/1978 | Looschen | 375/17 |

FOREIGN PATENT DOCUMENTS

1237073  6/1971  United Kingdom .

*Primary Examiner*—Donald J. Yusko
*Attorney, Agent, or Firm*—John B. Frisone

[57] ABSTRACT

Binary/ternary transmission process and device. Several trains of binary signals are time-multiplexed by using registers RG1 and SER to generate a first binary sequence L applied to an ENCODE unit which also receives a second binary sequence D and clock information CP. When the information of sequence L is at one binary level, the resulting signal is coded in bipolar code. When the information of sequence L is the other binary level, the resulting signal is coded in biphase code.

9 Claims, 11 Drawing Figures

DATA TRANSMISSION METHOD AND DEVICES FOR PRACTICING SAID METHOD

BACKGROUND OF THE INVENTION

1. Field of the Invention

This invention relates to a digital transmission method for simplifying data transmissions between a computer and terminals and to devices for practicing the method.

2. Description of the Prior Art

In general, teleprocessing networks include one or several computers serving terminals, i.e., exchanging a stream of binary signals with said terminals through transmission lines. In each network, the large number of terminals involves a large number of transmission channels and, therefore, very sophisticated and expensive equipment. In addition, it should be recalled that in addition to data signals, communications between each terminal and the associated computer, involve other logic signals. The whole set of signals to be considered can be divided into two similar groups: a transmission group (from the terminal) and a receiving group (towards the terminal). Each of said groups generally includes:

data signals,
control signals such as "request to send," "ready to send," "data terminal ready," "connect data terminal to the line," etc.
clock signals (if any).

If a transmission line is assigned to each of these signals, the number of wires needed is relatively large, which is, of course, a drawback.

The use of the multiplexing techniques allows the number of lines in the network to be reduced, but slows communications down, and above all, is particularly expensive when systems known in the art are used. In addition, a predetermined voltage polarity is generally used in the computers to represent one of the bit binary values and a zero voltage for the second bit value. These signals are not suited for a conventional line transmission and therefore, they must be processed prior to transmission. For more information on this subject, see the article of I. Dorros et al titled "An Experimental 224 Mb/s Digital Repeatered Line," published in the Bell System Technical Journal of September 1966. This article recommends the use of a PST code according to which the sequence of the binary signals belonging to a bit train to be transmitted is split into pairs of bits, then converted into a sequence of ternary signals defined in accordance with a conversion table.

One of the major drawbacks of the PST code is due to the fact that it is biased. In effect, the "11" and "00" pairs of bits, respectively, are converted into a positive pulse followed by a negative pulse (+ −) and into a negative pulse followed by a positive pulse (− +). Therefore, the phase of the signals provided by the "11" and "00" pairs can differ by 180° which could lead to a phase ambiguity at the receiving end. The error due to this ambiguity can be corrected, of course, when installing the equipment, by inverting the wires of the transmission line at one of its ends after the execution of the connection test. Nevertheless, this constraint is particularly awkward in practice. On the other hand, the "10" and "01" pairs of bits being respectively converted into + or − followed by zero and zero followed by + or −, are likely to cause a d.c. level shift if the original bit sequence exhibits an imbalance between the numbers of zeros and ones. In addition, the PST code does not permit a simple decoding of the resulting signal. And above all, this code applies only to a single binary sequence and, therefore, is not well suited for use with simple and inexpensive multiplex equipment.

OBJECTS OF THE INVENTION

Therefore, a major object of this invention is to provide a transmission method based on transcoding the bits to be transmitted, and solutions to the problems involved by the use of the prior art techniques.

Another object of this invention is to provide a transcoding method and structure for practicing same particularly suited for the use of multiplexing techniques.

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

Let D and L be two transmissions lines provided for carrying bit trains at a rate $f = 1/T$. In this specification, it is proposed to transcode these bit trains into ternary code, starting from bit pairs composed of one bit of each of the two lines and this, in accordance with the conversion table given below.

TABLE I

| | | Coding | | |
|---|---|---|---|---|
| D | L | T1 | T2 | |
| 0 | 0 | 0 | 0 | bipolar |
| 1 | 0 | (+) or (−) | 0 | |
| 0 | 1 | (−) | (+) | biphase |
| 1 | 1 | (+) | (−) | | where $T_1 = T_2 = T/2 = \frac{1}{2}$ (duration of a bit time)
(−) negative pulse
(+) positive pulse It appears that the signals resulting from processing "00" and "10" pairs are in bipolar code while the ones resulting from processing "01" and "11" pairs are in biphase code, which offers many advantages, in particular for the decoding operation. In effect, the state of channel L will be given by the recognition of the type of code. If said code is bipolar, then L=0, and if it is biphased, L=1. Both codes can be discriminated without any doubt, starting from the fact that the biphased code always has two distinct polarities within a bit time T, while the bipolar code has, at most, only one polarity per bit time. In addition, the 180° phase ambiguity is avoided very simply. This can be done, in particular, by first coding information D in differential mode when channel L is set to 1 and by coding channel D in conventional binary code when L=0. In differential coding, the information is derived by the difference with the preceding information (only for L=1). For instance, a transition will correspond to a "1" and no transition to a "0". The interlacing of these two codes is not dependent on the absolute polarity, and the signal can be inverted without affecting its interpretation.

In addition, if the rate of the signals appearing on channel L is lower than the rate on channel D, it is possible to time multiplex several channels of type L and to apply the invention to the resulting channel as described below.

Figure 1:
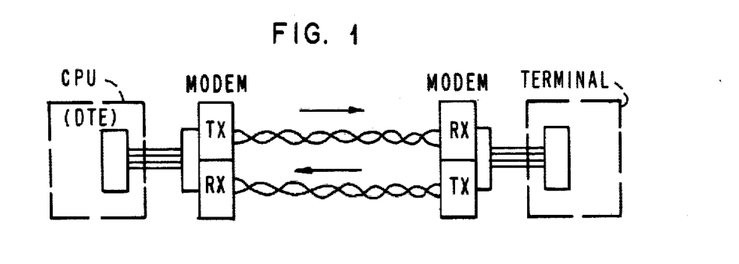
FIG. 1 is a diagram of a transmission system installed between the Data Processing Terminal Equipment (DTE) and the Terminal.

Taking these characteristics into account, it appears that the invention is particularly well suited for use in communications between a data processing terminal equipment (DTE) and a terminal. The conventional links between a DTE equipment and a terminal are generally constructed in accordance with the diagram shown in FIG. 1. It should be noted that two modems are provided to match the electrical line characteristics. One of the modems is associated with the DTE equipment and the second, with the terminal. Each of these modems is installed close to the device it serves.

Figure 2:
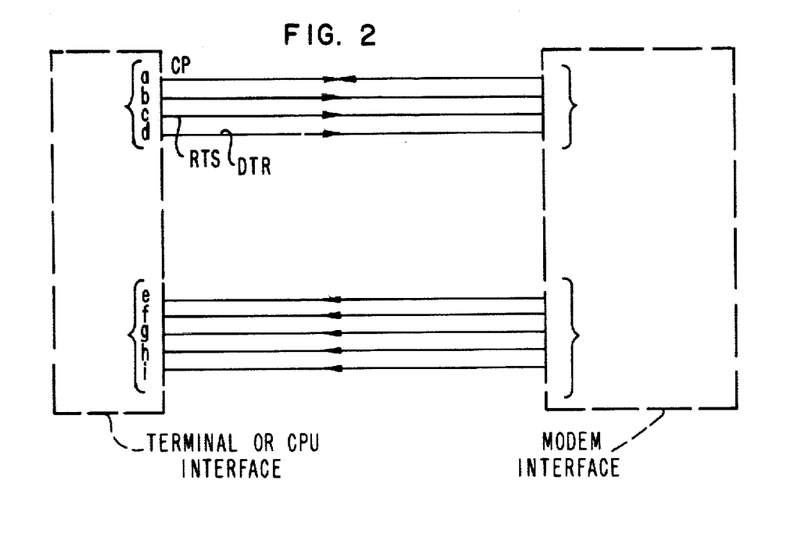
FIG. 2 is an enlarged view of a portion of the diagram of FIG. 1.

Two-wire lines connect the transmission section (TX) of each modem to the receiving section (RX) of the other. But between the DTE equipment (or terminal) and the modem, a larger number of wires as shown in FIG. 2 is used in a conventional interface. Typically, nine wires are used: four wires for transmission and five for reception. These wires are provided to carry the following signals defined in accordance with the CCITT standard:
 (a) Transmit clock (CP)
 (b) Transmitted data
 (c) Request to send (RTS)
 (d) Data Terminal Equipment ready
 (e) Receive clock
 (f) Received data
 (g) Ready to send
 (h) Data set ready
 (i) Carrier detect Other signals may be required for certain types of links; however, those indicated above are the most commonly used.

Figure 3:
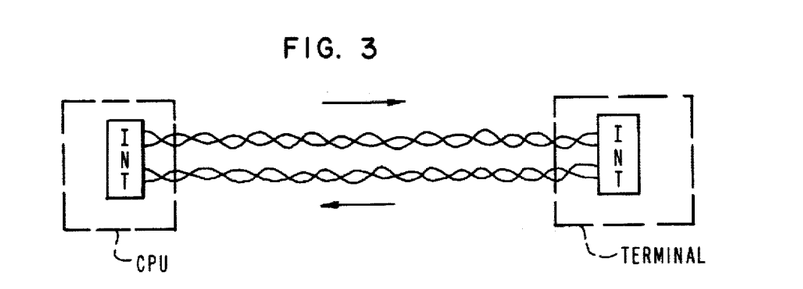
FIGS. 3, 4 and 6 are diagrams of circuits for embodying this invention.
Figure 6:
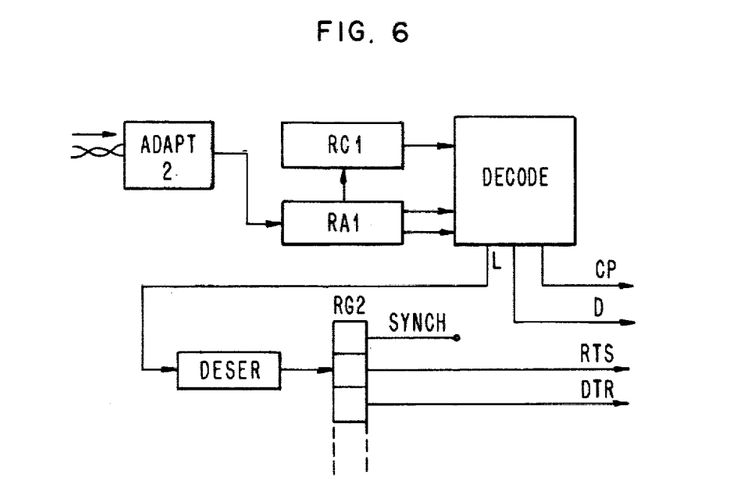

They can be divided into three classes: clock signals, control signals and data signals. The invention provides means for reducing the number of wires needed for carrying these signals to four wires as shown in FIG. 3. The modems can be replaced by interface circuits including a transmitting section (FIG. 4) and a receiving section (FIG. 6).

Figure 4:
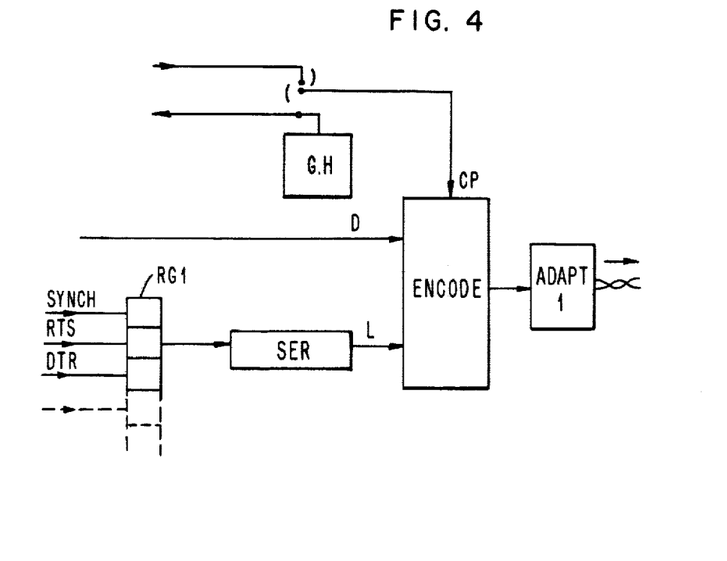

First of all, it should be noted in FIG. 4 that the control signals are multiplexed. In effect, in the transmitting section in encoding (or transcoding) a three input ENCODE is used in which the signals are encoded to be transmitted on a single two wire line. One input for the clock signals (CP), the second one for the data (D) and the third one (L) on which the control signals have been multiplexed. The multiplexing circuit includes a register RG1 receiving the control signals, and a serializing register SER.

Clock signals (CP) are provided either by an internal clock generator GH, or by an external clock not shown in the figure. They are used to define the rate at which the sequences of binary signals on lines L and D are to be transcoded into a single ternary signal by applying the principles of this invention, and more particularly, by coding the resulting signal in bipolar code when the information on line L is set at one of the binary levels and in differential biphased code when the information on line L is set at the second binary level.

Circuit ENCODE operates logically in accordance with the truth given below:

TABLE II

| L at | | Code at | D | | Bipolar memory | Bi-phase memory | Encoding unit output at | | | |
|---|---|---|---|---|---|---|---|---|---|---|
| | | | Transition at | at | | | | | | |
| $T_{-1}$ | $T_0$ | $T_0$ | $T_0$ | $T_0$ | $F_2$ | $F_1$ | $T_{-1}$ | | $T_0$ | |
| 1 | 1 | Bi-phase | 0 | NO | X | 1 | (+) (−) | | (+) | (−) |
| | | | | | X | 0 | (−) (+) | | (−) | (+) |
| 1 | 1 | Bi-phase | 1 | YES | X | 1 | (+) (−) | | (−) | (+) |
| | | | | | X | 0 | (−) (+) | | (+) | (−) |
| 0 | 0 | Bipolar | 0 | | X | X | X X | | 0 | 0 |
| | | | | | X | X | X X | | 0 | 0 |
| 0 | 0 | Bipolar | 1 | | 1 | X | (+) 0 | | (−) | 0 |
| | | | | | 0 | X | (−) 0 | | (+) | 0 |
| 1 | 0 | Bipolar | 0 | | 1 | X | X $\overline{X}$ | | 0 | 0 |
| | | | | | 0 | X | X $\overline{X}$ | | 0 | 0 |
| 1 | 0 | Bipolar | 1 | | 1 | X | X $\overline{X}$ | | (−) | 0 |
| | | | | | 0 | X | X $\overline{X}$ | | (+) | 0 |
| 0 | 1 | Bi-phase | 0 | NO | X | 1 | X 0 | | (+) | (−) |
| | | | | | X | 0 | X 0 | | (−) | (+) |
| 0 | 1 | Bi-phase | 1 | YES | X | 1 | X 0 | | (−) | (+) |
| | | | | | X | 0 | X 0 | | (+) | (−) |

In this table:
$T_0$ indicates the present time (more precisely, the present bit time)
$T_{-1}$ indicates the last bit time preceding $T_0$ Columns D at $T_0$ and L at $T_0$ represent the bits on channels L and D at time $T_0$ respectively. The encoding to be used at bit time $T_0$ in accordance with Table I is derived from the configuration of each of the bit pairs comprising one bit of each channel. The logic value of L at $T_{-1}$ indicates whether the code was bipolar or bi-phased at the bit time immediately preceding $T_0$.

In addition, the contents of the "bi-phase memory" and the "bipolar memory" enables determining the polarity of the signals to be used in the present bit time. The polarities of the signals generated at $T_0$ will depend on the polarities of the just preceding signals of the same type, which have been recorded. For instance, according to Table I, for $D=1$ and $L=0$, $(+)$, 0 or $(-)$, 0 could be chosen. The final choice depends on the last previous bipolar combination.

This combination is indicated by the contents of the "bipolar memory" position $F_2$ in which a "1" bit or a "0" bit would have been stored according to whether the last bipolar combination was $(+)$, 0 or $(-)$, 0. The same principle is used in bi-phase mode although this does not appear on Table I, the differential encoding being not yet applied at this level. Differential encoding will be carried out by consulting a so-called "bi-phase" memory $F_1$ into which a "1" bit or a "0" bit would have been stored depending on whether the last bi-phase combination was $(+)$, $(-)$ or $(-)$, $(+)$. It has been decided here to perform a voltage transition when, for $L=1$, information $D=1$. In bi-phase mode, this leads to a signal phase reversal.

When consulting Table II for $L=1$ and $D=1$, it appears that the phase of the bi-phase signal has changed from $T_{-1}$ to $T_0$, bi-phase memory $F_1$ allowing both cases to be discriminated from each other. For $L=1$ and $D=0$, it was decided that there would be no transition, therefore no phase shift, and this case is shown on Table II.

The choices defined above are not mandatory, but they allow the spectral qualities of the signal sent over the transmitter output line to be optimized to a certain extent.

It should be added that, although the invention is described in this specification as using a bipolar code of first order, those skilled in the art could extend it very easily to the use of other types of bipolar codes. In the same way, this invention may be extended to more sophisticated codes such as the CHDB code described by A. Croisier in the IEEE Transactions on Communication Technology review of June 1970, pages 265 et seq. Let us refer again to Table II which describes the following coding conditions:

(1) On the first line of Table II at time $T_0$, $D=0$ and $L=1$. According to Table II, the bi-phase code must be used. But as far as the polarities are concerned, the preceding code must be taken into account. It appears that at $T_{-1}$, $L=1$, which means that at this time, the code was also biphased. $T_{-1}$ is the closest preceding bit time during which a bi-phase code was executed. If the contents of the bi-phase memory is "1," then the signal at $T_{-1}$ was $(+)$, $(-)$; if in the contrary the contents is "0," then the signal was $(-)$, $(+)$. Therefore, the signal at $T_0$ must be $(+)$, $(-)$ in the first case and $(-)$, $(+)$ in the second case. From the foregoing, it appears that the contents of the "bipolar memory" has no function to ensure in this case, which is indicated by an "X" in the corresponding column of Table II.

(2) On the next line of Table II, $D=1$ and $L=1$ at $T_0$. The code to be used is still biphased. As at $T_{-1}$, $L=1$. This case is similar to the one of the preceding line of Table II. It is the so-called "transition at $T_0$" information on channel D which will make the difference between the two cases. In effect, as indicated above, channel D is encoded in differential mode. And in this case, a transition level on channel D corresponds to $D=1$. In view of this transition, the encoding unit makes $(-)$, $(+)$ to follow $(+)$, $(-)$ and conversely, as opposed to the preceding case. Then, the phase of the bi-phase code is reversed, which indicates a transition.

(3) Here $D=0$ and $L=0$ at $T_0$, indicating that the code must be bipolar 0,0. In this case, the previous codes have no significance.

(4) $D=1$, $L=0$ at $T_0$. The code to be used is the bipolar code. $L=0$ at $T_{-1}$ indicates that the code was also bipolar at this time. If the "bipolar memory" contains 1, indicating a $(+)$, 0 at $T_{-1}$ which must be followed by $(-)$, 0 at $T_0$. If the "bipolar memory" contains 0, it is the opposite case and $(+)$, 0 must be used at time $T_0$.

(5) At $T_0$, $D=0$ and $L=0$: bipolar code 0,0 must be used regardless of previous states. The bi-phase code of the preceding bit time, i.e., $T_{-1}$, is represented by X and X since its polarity does not affect the code to be generated at $T_0$.

(6) $D=1$ and $L=0$ at $T_0$; the bipolar code is chosen. This code should be $(-)$, 0 or $(+)$, 0 depending on whether the bipolar memory contains 1 or 0.

(7) $D=0$ and $L=1$ at $T_0$: Bi-phase code $(+)$, $(-)$ or $(-)$, $(+)$ is chosen depending on whether the "bipolar memory" contains 1 or 0.

(8) $D=1$ and $L=1$ at $T_0$: the bi-phase code is chosen. A phase reversal of the bi-phase signal should be carried out. The contents of $F_1$ enables appropriate polarities selection.

Figure 5:
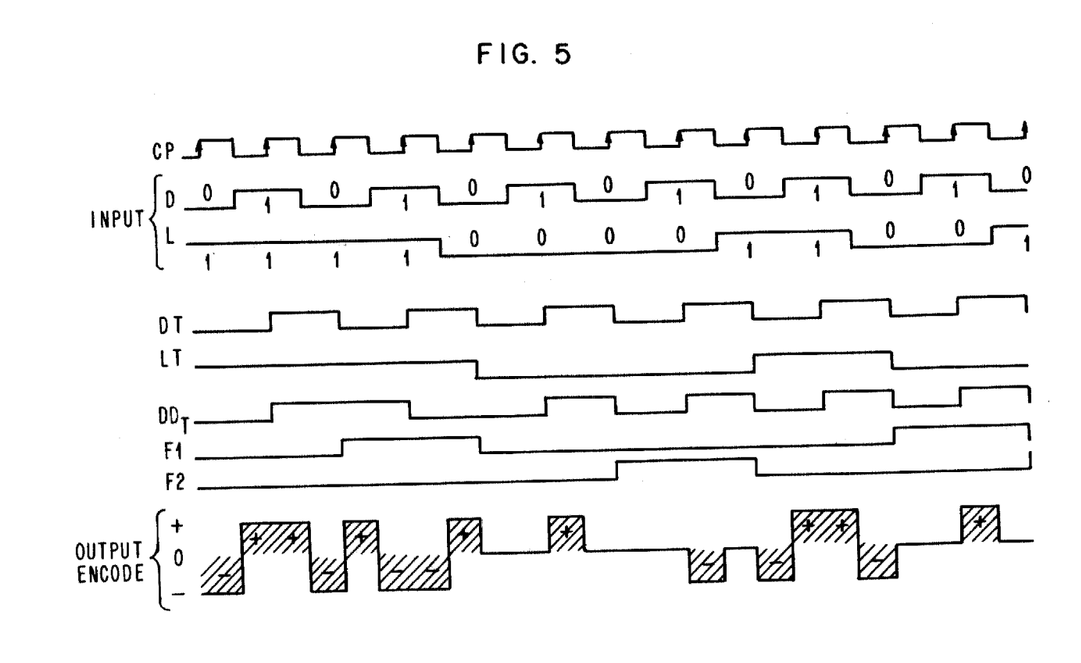
FIG. 5 is a graphical showing of coding according to this invention.

FIG. 5 shows a time diagram illustrating the various conditions which have been summarized in the foregoing. This diagram is easily understood if one keeps in mind that $D_T$ and $L_T$, respectively, are the logic levels of D and L at the sampling times defined by the arrows represented on the clock signal CP, and that the information of channels L and D are coded in a simple binary mode with the low level for zero and the high level for one. In addition, a line $DD_T$ is shown on which appears signal $D_T$ encoded in differential mode when $L_T=1$ and in simple binary mode, i.e., with the high level for $D_T=1$ and the low level for $D_T=0$, when $L_T=0$.

first bit time (left off FIG. 5), $D_T=0$, $L_T=1$ and $F_1=0$: the code $(-)$, $(+)$ is chosen. Therefore, a bi-phase signal $(-)$, $(+)$ is provided at the "ENCODE" output.

second bit time: $D_T=1$, $L_T=1$ and $F_1=0$: the bi-phase code is chosen, but as $D_T=1$, there is a transition on channel D (see $DD_T$) and $(+)$, $(-)$ code is selected.

third bit time: $D_T=0$, $L_T=1$ and $F_1=1$. The bi-phase code $(+)$, $(-)$ is chosen.

fourth bit time: $D_T=1$, $L_T=1$ and $F_1=1$. The bi-phase code $(-)$, $(+)$ is chosen.

fifth bit time$=D_T=0$, $L_T=0$, $F_2=0$. The bipolar code 0,0 is chosen.

sixth bit time: $D_T=1$, $L_T=0$, $F_2=0$. The bipolar code $(+)$, 0 is chosen.

seventh bit time: $D_T=0$, $L_T=0$, $F_2=1$. The bipolar code 0,0, is chosen.

eighth bit time: $D_T=1$, $L_T=0$, $F_2=1$. The bipolar code $(-)$, 0, is chosen.

ninth bit time: $D_T=0$, $L_T=1$, $F_1=0$. The biphase code $(-)$, $(+)$ is chosen.

tenth bit time: $D_T=1$, $L_T=1$, $F_1=0$. The bi-phase code $(+)$, $(-)$ is chosen.

eleventh bit time: $D_T=0$, $L_T=0$, $F_2=0$. The bipolar code 0,0 is chosen.

twelfth bit time: $D_T=1$, $L_T=0$, $F_2=0$. The bipolar code (+), 0 is chosen.

Thus the ternary signal shown on the lower line of the figure is obtained at the output of device ENCODE.

In other words, encoding circuit ENCODE complies with the following rules:

(1) The logic level at the encoder output is positive for the following logic equation:

$$CP(L_T \cdot \overline{D_T} \cdot F_1 + L_T \cdot C_T \cdot \overline{F_1} + \overline{L_T} \cdot D_T \cdot \overline{F_2}) +$$

$$\overline{CP}(L_T \cdot \overline{D_T} \cdot \overline{F_1} + L_T D_T \cdot F_1) = 1$$

(2) The logic level at the encoder output is equal to zero when:

$$CP(\overline{L_T D_T}) + \overline{CP} \cdot \overline{L_T} = 1$$

(3) The logic level at the encoder output is negative when:

$$CP(\overline{F_1} \cdot \overline{D_T} \cdot L_T + F_1 \cdot D_T \cdot L_T + F_2 \cdot D_T \cdot \overline{L_T}) +$$

$$\overline{CP}(F_1 \cdot \overline{D_T} \cdot L_T + \overline{F_1} \cdot D_T \cdot L_T) = 1.$$

The logic equations set forth above define the ENCODE circuits. The signals provided by ENCODE are applied to the transmission line through adapter ADAPT 1 which provides voltage levels sufficient to drive the transmission lines.

In addition, at the receiving end, interface as shown in FIG. 6, the transmission line is connected to line adapter ADAPT 2 which drives a clock extractor (RC1) and an analog receiver (RA1). The signals from RC1 and RA1 are provided to a circuit DECODE which provides clock information (CP), data information (D) and control information (L). The signals (L) are demultiplexed by using a shift register DESER and an register RG2.

Figure 8:
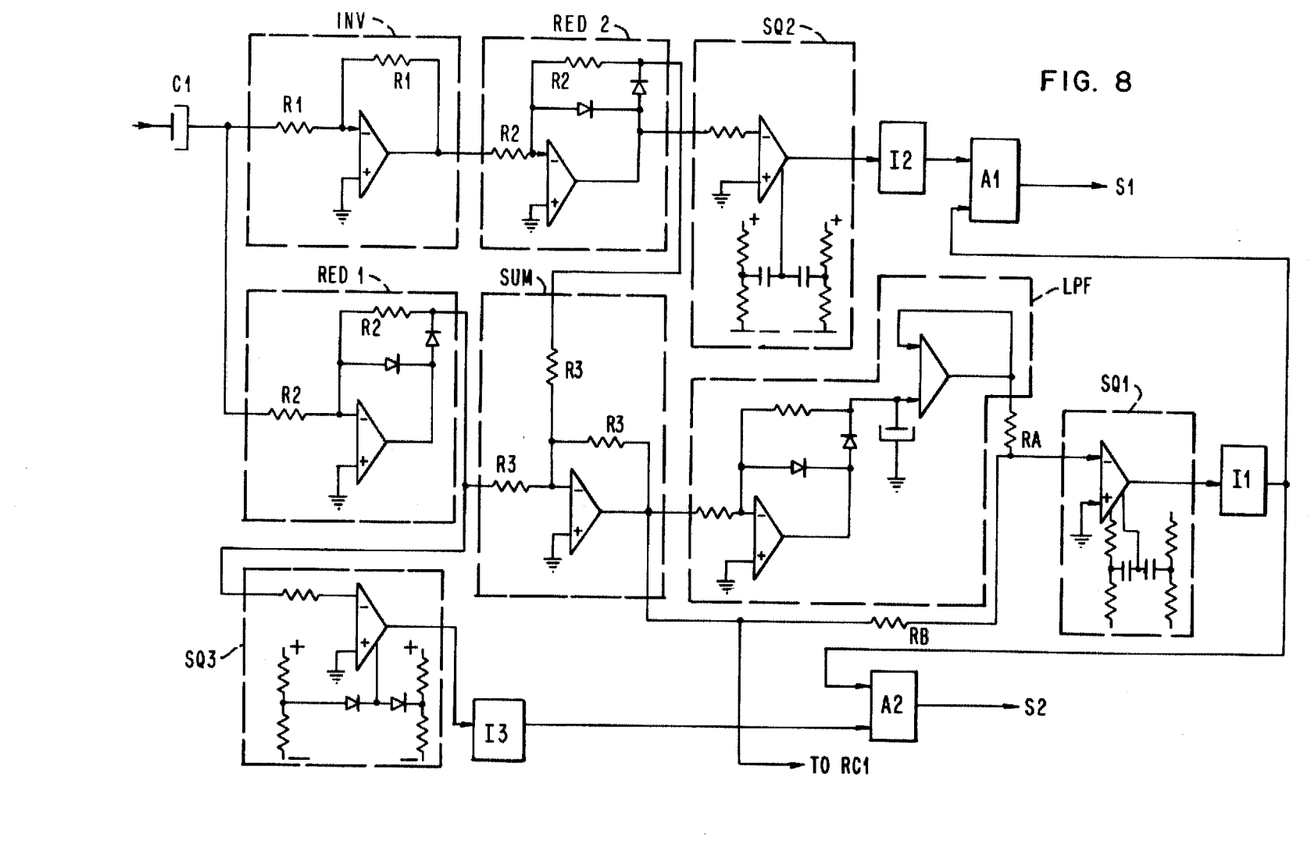
FIG. 8 shows an embodiment of a section of the receiving device embodied in accordance with the invention.

The analog receiver RA1 is shown in greater detail in FIG. 8. The input signal equalized in ADAPT 2 is applied to half-wave rectifiers RED 1 and RED 2 through a by-pass capacitor C1. RED 2 is preceded by an inverter INV. A circuit SUM adds the outputs of RED 1 and RED 2 to provide a half-wave rectified signal transmitted to both RC1 and a lowpass filter LPF. Circuit RC1, which will be described later on, performs clock extraction. The LPF output defines a d.c. reference level which is transmitted to a clipper SQ1 through a resistor RA. In the same way, the SUM output is transmitted to SQ1 through a resistor RB. The choice of the RA/RB ratio defines the discrimination level or threshold of the analog receiver. This threshold inverted in $I_1$ is used to control the gates A1 and A2 respectively connected to the SQ2 and SQ3 outputs through inverters $I_2$ and $I_3$. The SQ2 and SQ3 inputs, respectively, are connected to the RED 2 and RED 1 outputs. A signal at the output S1 of A1 indicates the reception of a (+) level, while a signal at the output S2 of A2 indicates the reception of a (−) level. Therefore, the analog receiver indicates the position of the received signal with respect to the threshold. This signal must be sampled at the appropriate instants by using a signal CP obtained from the clock information, to determine the logic levels corresponding to the received signal.

It should be noted that the frequency spectrum transmitted by the transmitter described in the foregoing, therefore, also the one received at the input of the analog receiver, shows a null energy for all the frequency multiples of 2f. The clock information at the receiving end may therefore be recovered by filtering and clipping the received signal. This is carried out by the device shown in FIG. 7 which includes a filter BF and a peak clipper SQ. To avoid noise interference, BF is comprised of two bandpass filters BPF 1 and BPF 2 centered on 2f and placed on both sides of a switched filter SWF.

Figure 7:
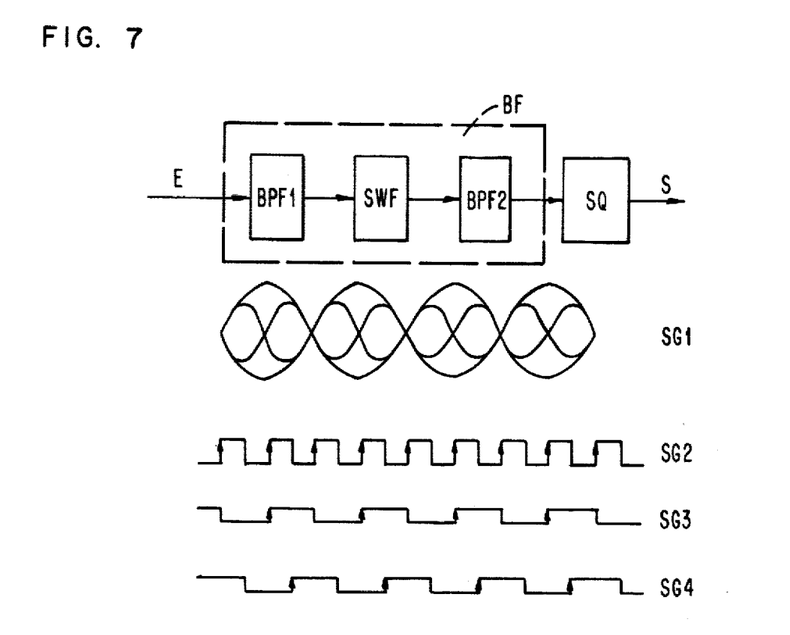
FIGS. 7 and 7A are diagrams illustrating the operation of devices included in the receiver of this invention.

The eye of the received bipolar/biphased signal is shown in SG1. The signal at rate 2f obtained from output S of SQ is shown in SG2. The signal at frequency f obtained by dividing rate 2f of SG2 by two is shown in SG3. The $\pi$ ambiguity of this signal was resolved by using a logic circuit analyzing the transitions of the eye shown in SG1. A $\pi/2$ phase shift with respect to SG3 gives a signal shown in SG4 which will be used by DECODE as a sampling signal.

Figure 7A:
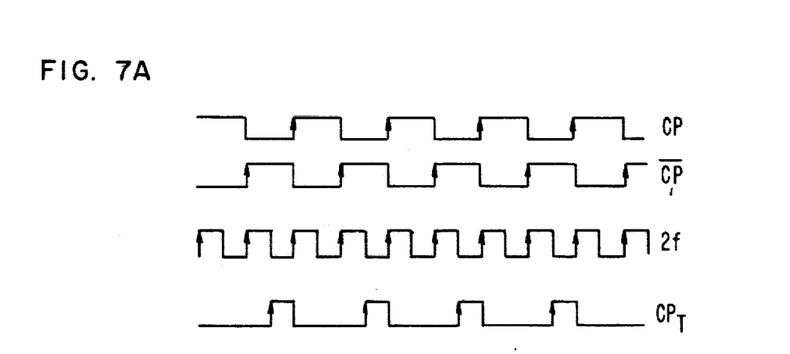
Figure 9:
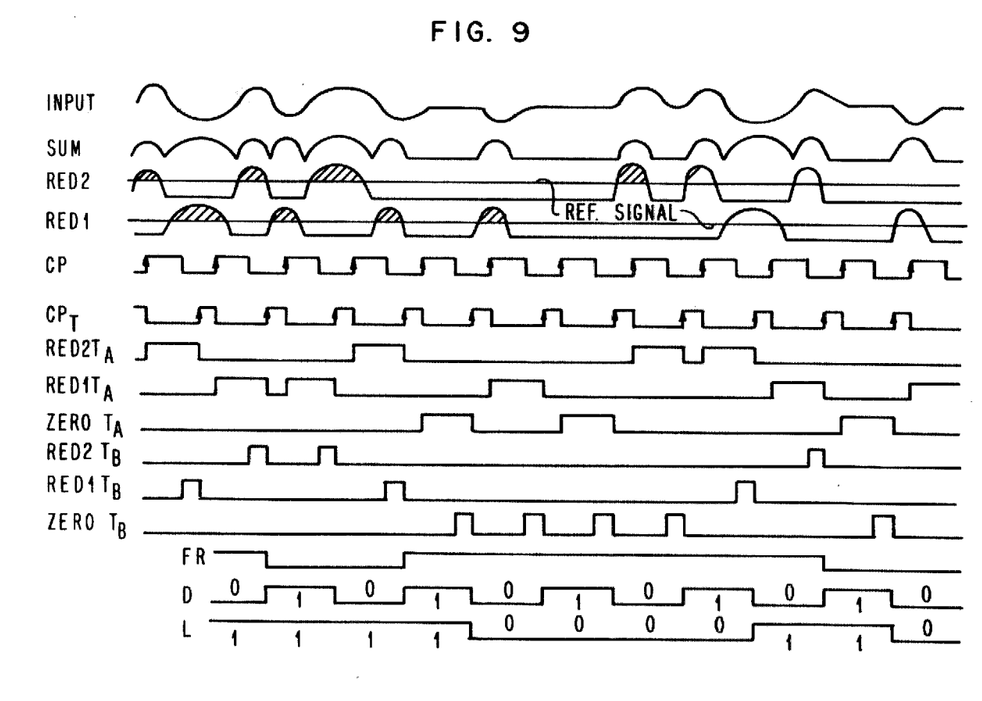
FIG. 9 is a diagram illustrating the operation of the receiving device of this invention.

In fact, for DECODE, the clock signals of FIG. 7A will be used. This figure shows CP, corresponding to SG4, its inverse $\overline{CP}$, a signal at frequency 2f obtained from CP and a signal $CP_T$, the function of which will be described later on (FIG. 9).

Using the information provided by RA1 and RC1 and taking the encoding rules used in ENCODE into account, a device DECODE provides the desired binary signals back. Therefore, DECODE ensures a ternary to binary conversion by using simple logic operations, based on the following table:

TABLE III

| $T_A$ | $T_B$ | "biphase" memory FR | L | D |
|---|---|---|---|---|
| (+) | (−) | 1 | 1 | 0 |
|  |  | 0 | 1 | 1 |
| (−) | (+) | 1 | 1 | 1 |
|  |  | 0 | 1 | 0 |
| (+) | 0 | X | 0 | 1 |
| (−) | 0 | X | 0 | 1 |
| 0 | 0 | X | 0 | 0 |

In this table, $T_A$ and $T_B$ represent the sampling instants of the received signal. The other columns of Table III contain information of the same type as the ones of Table II. In particular, the biphase memory (referenced FR to avoid any confusion with the one of the transmitter) stores 1 or 0 depending on whether the decoding biphase code is (+), (−) or (−), (+). This information is used to decode the biphase information received during a subsequent bit time. But is was seen above that this information could be insufficient by itself in some cases, when a phase reversal appeared as necessary. If circuit DECODE denotes a change of state in the ternary signal (+), (−) or (−), (+), during a bit time, it deduces that the received code is biphased. Therefore, L=1. But to determine D, the contents of the "biphase memory" must be taken into account. If it contains a "1" while the signal being processed is (+), (−), there was no phase reversal; therefore, no transition at the transmitting end. Therefore, D=0. If the contents of the "biphase memory" was a "0", this means that the preceding biphase signal was (−), (+). It results from the foregoing that a phase reversal would have necessarily been performed at the transmitting end (transition). Therefore, D=1.

Conversely, for a signal (−), (+) being processed, if FR=1, a phase reversal has been performed and D=1 while if FR=0, no phase reversal was carried out and D=0.

An example of a decoding operation is shown in FIG. 9. To show that the process of this invention is free of phase shift problems due to transmission wire misconnections at the receiving end, it was chosen to decode a received signal which would correspond to the emitted signal of FIG. 5, but which would have been submitted to a $\pi$ phase shift.

The first line of FIG. 9 represents the equalized received signal. Therefore, it is the signal appearing at the input of the receiver of FIG. 8.

The second line represents the signal provided by the inverted SUM circuit.

The third and fourth lines respectively show the signals provided by circuits RED 2 and RED 1 of the analog receiver. The d.c. reference level provided by circuit LPF of FIG. 8 is also represented in these figures.

The fifth and sixth lines represent the clock signal used as a sampling signal. More particularly, the leading edges of CP are used to sample the outputs of RED 1 and RED 2 at times $T_A$. The leading edges of $CP_T$ are used to reset the logic latches before the end of each bit time (refer to FIG. 10).

The seventh and eighth lines respectively show references RED 2 $T_A$ and RED 1 $T_A$. They indicate a high logic level when, at instants $T_A$, the signals bearing references RED 2 and RED 1 in FIG. 9 are above their thresholds. Information $CP_T$ is used to bring logic levels RED 2 $T_A$ and RED 1 $T_A$ back to the low value.

The ninth line indicates the instants at which the input signal represents a zero logic value for a sampling at $T_A$. The level of this line is high when there is no output of RED 1 or RED 2 above the threshold level between an instant defined by CP and another one defined by $CP_T$.

The tenth to twelfth lines provide the same information as the three preceding lines, but at instants defined by $T_B$ instead of $T_A$.

The logic level of "biphase memory" FR is shown on the thirteenth line.

It should be recalled that signal FR is set to the high level when the input signal is biphased and of type (+), (−), for a bit time. It remains at this level until the input signal becomes biphased and coded (−), (+). In addition, it should be noted that the level change of FR appears with a delay corresponding to one bit time. In FIG. 9, during the first bit time, high levels appear in RED 2 $T_A$ and RED 1 $T_B$, indicating a biphase signal of type (+), (−). During the next bit time, FR=1. Then, RED 1 $T_A$=1 and RED 2 $T_B$=1 appear for two consecutive bit times. Thus, FR goes to zero and remains at this value for two bit times. Then RED 2 $T_A$=1 and RED 1 $T_B$=1 appear again and FR=1. As the input signal is bipolar for the next five bit times, FR goes to the high logic level and remains at this level for six bit times. When RED 1 $T_A$=1 and RED 2 $T_B$=1 appearing on the decoder, FR comes back to the low level. It appears that information FR is inverted with respect to the one indicated by F1 in FIG. 5.

Finally, the last two lines represent binary information D and L decoded in accordance with the above-indicated rules. It should be noted that signals D and L obtained in this way are identical with the ones transmitted (see FIG. 5), although the received signal has been inverted with respect to the emitted signal. This shows that the transmission process of this invention is insensitive to a systematic phase reversal of the signal between the emitter and the receiver.

Figure 10:
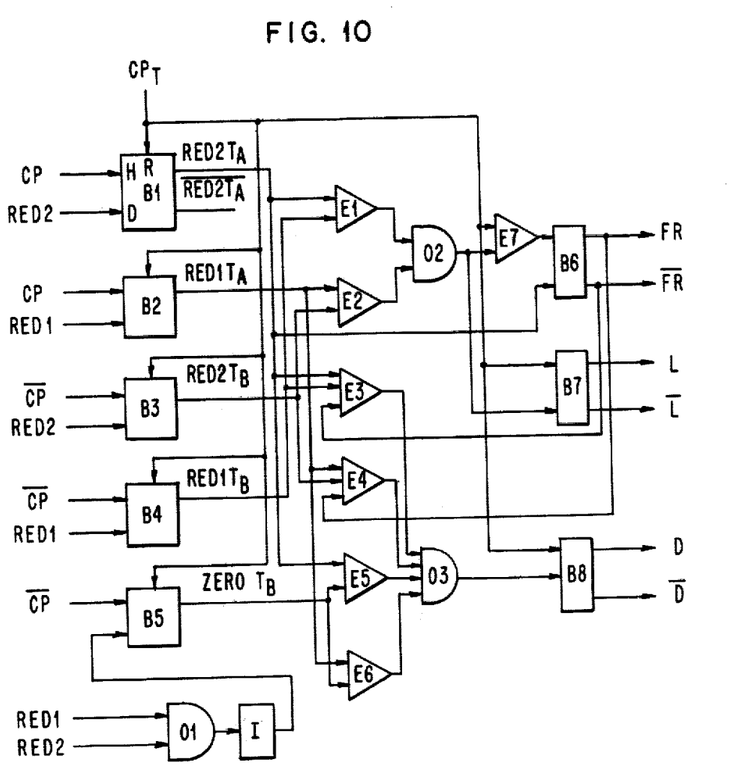
FIG. 10 shows a decoding logic circuit applying the techniques of this invention.

The above-described logic functions can be embodied in a very simple manner, more particularly by using the logic circuit shown in FIG. 10. This circuit includes seven AND circuits bearing references E1 to E7, three OR circuits 01 to 03, an inverter I and eight latches B1 to B8. Said latches include three inputs (R, H and D), a normal output and an inverted output. Input D receives the data, input H is a timing input. The state of the latch is set by the logic level applied to input D when input H receives a signal at logic level 1. Input R is used to reset the latch.

The functions and connections of the various latches are given in the following table:

|    | Inputs |        |           | Normal      |
|----|--------|--------|-----------|-------------|
|    | H      | R      | D         | Output      |
| B1 | CP     | $CP_T$ | RED 2     | RED 2 $T_A$ |
| B2 | CP     | $CP_T$ | RED 1     | RED 1 $T_A$ |
| B3 | $\overline{CP}$ | $CP_T$ | RED 2 | RED 2 $T_B$ |
| B4 | $\overline{CP}$ | $CP_T$ | RED 1 | RED 1 $T_B$ |
| B5 | $\overline{CP}$ | $CP_T$ | 1     | ZERO $T_B$  |
| B6 | E7     |        | RED 2 $T_A$ | FR        |
| B7 | $CP_T$ |        | 02        | L           |
| B8 | $CP_T$ |        | 03        | D           |

The logic functions of the other circuit elements can be defined as follows: 01 = RED 1 + RED 2
I = $\overline{01}$
E1 = RED 2 $T_A$.RED 1 $T_B$
E2 = RED 1 $T_A$.RED 2 $T_B$
E3 = RED $T_A$.RED 1 $T_B$.$\overline{FR}$
E4 = RED 1 $T_A$.RED 2 $T_B$.FR
E5 = RED 2 $T_A$.ZERO $T_B$
E6 = RED 1 $T_A$.ZERO $T_B$
E7 = $CP_T$.02
02 = Z1 + E2
03 = E3 + E4 + E5 + E6

It should be noted that the embodiment of this invention is relatively simple. It is particularly suitable for implementing standard interface transceivers, more particularly ensuring links of the following types DTE to terminal, DTE or terminal to Modem, DTE or terminal to data network and DTE or terminal to multiplexor. By accepting an attenuation of 20 dB approximately, it is possible to cover transmission distances on ordinary lines up to 20 km at 2400 bps, 15 km at 4800 bps and 12 km at 9600 bps.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. A method for encoding a first and a second independent binary signal sequence as a single ternary signal sequence comprising the steps of:
   grouping time corresponding binary signals of said first and second sequences into pairs, each pair comprising a first binary signal from said first sequence and a second binary signal from said second sequence, and
   encoding each pair as a bipolar signal when said first binary signal has a first predetermined value, and as a biphase signal when said first binary signal has a value complementary to that of said first predetermined value.

2. A method according to claim 1, in which the phase of said biphase signal and the polarity of said bipolar signal are selected as a function of the phase of the previously encoded biphase signal and the polarity of the previously encoded bipolar signal, respectively.

3. A method according to claim 1, in which the binary signals from said second sequence are differentially encoded before being grouped into pairs when said first binary signal has a first given value.

4. A method according to claim 3, in which the phase of said biphase signal is inverted when the differentially encoded signal in the pair has a second predetermined value.

5. A method for transmitting first and second independent binary signal sequences over a transmission medium as a single ternary signal sequence comprising the steps of:

grouping time corresponding binary signals of said first and second sequences into pairs, each pair comprising a first binary signal from said first sequence and a second binary signal from said second sequence, encoding each pair as a bipolar signal when said first binary signal has a first predetermined value, and as a biphase signal when said first binary signal has a value complementary to that of said first predetermined value, and transmitting said encoded signals over said transmission medium.

6. A method according to claim 5, in which the phase of said biphase signal and the polarity of said bipolar signal are selected as a function of the phase of the previously encoded biphase signal and the polarity of the previously encoded bipolar signal, respectively.

7. A method according to claim 6, in which the binary signals from said second sequence are differentially encoded before being grouped into pairs when said first binary signal has a first given value.

8. A method according to claim 7, in which the phase of said biphase signal is inverted when the differentially encoded signal in the pair has a second predetermined value.

9. A method according to any one of claims 1-8 in which one of said binary signal sequences is a time division multiplex signal representing n combined binary signals from n sources.

* * * * *